(12) United States Patent
Tabaro et al.

(10) Patent No.: US 7,744,132 B2
(45) Date of Patent: Jun. 29, 2010

(54) DAMPING CONDUIT ASSEMBLY PROVIDED WITH A CONNECTING UNIT FOR A HYDRAULIC CIRCUIT

(75) Inventors: Fabrizio Tabaro, Turin (IT); Mariofelice Zanardi, Turin (IT)

(73) Assignee: Dayco Fluid Technologies S.p.A., Turin (IT)

( * ) Notice: Subject to any disclaimer, the term of this patent is extended or adjusted under 35 U.S.C. 154(b) by 0 days.

(21) Appl. No.: 11/996,429

(22) PCT Filed: Jul. 22, 2005

(86) PCT No.: PCT/IT2005/000433
§ 371 (c)(1),
(2), (4) Date: Aug. 29, 2008

(87) PCT Pub. No.: WO2007/010572
PCT Pub. Date: Jan. 25, 2007

(65) Prior Publication Data
US 2008/0309078 A1    Dec. 18, 2008

(51) Int. Cl.
*F16L 55/00* (2006.01)
*F16L 37/00* (2006.01)
(52) U.S. Cl. .............. 285/148.1; 285/148.14; 285/148.17; 285/148.21; 285/148.2; 285/220; 285/901
(58) Field of Classification Search .......... 285/129.1, 285/148.1, 148.3, 148.6, 148.8, 148.14, 148.17, 285/148.19, 148.21, 148.22, 148.26, 148.2, 285/219, 220, 233, 383, 901
See application file for complete search history.

(56) References Cited

U.S. PATENT DOCUMENTS 198,027 A * 12/1877 King ............... 285/148.19

(Continued)

FOREIGN PATENT DOCUMENTS

EP    0955470    11/1999

(Continued)

OTHER PUBLICATIONS

International Search Report prepared by the European Patent Office on Mar. 6, 2006, for PCT/IT2005/000433; Applicant, Dayco Fluid Technologies S.p.A.

(Continued)

*Primary Examiner*—James M Hewitt
(74) *Attorney, Agent, or Firm*—Sheridan Ross PC

(57) ABSTRACT

Damping conduit assembly (4) for a hydraulic system comprising a user (3) and a pipe (2) connected to the user (3) by means of a first connecting element (6) and presenting an end portion (20) having a first axis (B) and a bush (15) carried by the end portion (20) and having a second axis (A) transverse to the first axis (B), the bush (15) also housing the first connecting element (6) for fluidly connecting the user (3) to the pipe (2), the conduit assembly (4) being suited to be fluidly connected to the pipe (2) and comprising a flexible cylindrical wall (27), a closing element (29) axially delimiting an internal volume (30) of the cylindrical wall (27) filled with fluid. The conduit assembly (4) also comprises a connecting unit (5) comprising the first connecting element (6) and a second connecting element (22) carried by the cylindrical wall (27) and coupled to the first connecting element (6).

11 Claims, 2 Drawing Sheets

U.S. PATENT DOCUMENTS

| | | | |
|---|---|---|---|
| 562,127 A * | 6/1896 | Fowler et al. | 137/321 |
| 713,113 A * | 11/1902 | Kraemer et al. | 222/400.7 |
| 1,337,455 A * | 4/1920 | Knapp | 73/731 |
| 1,649,159 A * | 11/1927 | Fesler | 222/536 |
| 2,555,869 A * | 6/1951 | Bright | 285/148.2 |
| 3,314,696 A * | 4/1967 | Ferguson et al. | 285/148.14 |
| 3,473,565 A | 10/1969 | Blendermann | |
| 5,429,151 A * | 7/1995 | Millett et al. | 137/315.18 |
| 5,904,376 A * | 5/1999 | Yuen | 285/39 |
| 6,123,108 A | 9/2000 | Chen et al. | |
| 6,641,175 B2 * | 11/2003 | Kirby | 285/81 |
| 6,764,104 B2 * | 7/2004 | Berg | 285/148.3 |

FOREIGN PATENT DOCUMENTS

| | | |
|---|---|---|
| EP | 1174634 | 1/2002 |
| GB | 1243429 | 8/1971 |
| JP | 05223192 A * | 8/1993 |

OTHER PUBLICATIONS

International Preliminary Report on Patentability prepared by the European Patent Office on Aug. 13, 2008 for PCT/IT2005/000433; Applicant, Dayco Fluid Technologies S.p.A.

International Search Report prepared by the European Patent Office on Mar. 6, 2006, for PCT/IT2005/000433; Application, Dayco Fluid Technologies S.p.A.

International Preliminary Report on Patentability prepared by the European Patent Office on Aug. 13, 2007 for PCT/IT2005/000433; Applicant, Dayco Fluid Technologies S.p.A.

* cited by examiner

DAMPING CONDUIT ASSEMBLY PROVIDED WITH A CONNECTING UNIT FOR A HYDRAULIC CIRCUIT

CROSS REFERENCE TO RELATED APPLICATION

This application is a national stage application under 35 U.S.C. 371 of PCT Application No. PCT/IT2005/000433 having an international filing date of Jul. 22, 2005, which designated the United States, the entire disclosure of each of which is hereby incorporated herein by reference.

TECHNICAL FIELD

The present invention concerns a damping conduit assembly provided with a connecting unit for connection according to a preferred but not limiting application, to a low pressure branch of a power steering system of a motor vehicle.

BACKGROUND ART

A power steering system circuit generally comprises an actuator for steering the wheels of a vehicle, a pump that sucks up from a tank, a high pressure branch for connecting the pump delivery to the actuator and a low pressure branch for connecting the drainage of the actuator to the tank.

During operation, the low pressure branch is subject to pressure pulsations which tend to wear the components and to cause undesired noises.

To eliminate these inconveniences in other applications, a known practice is to use a blind damping conduit shunted by means of a connecting unit and having elastically yielding walls with dimensions such as to obtain an effect of destructive interference on the pressure pulsations.

DISCLOSURE OF INVENTION

The aim of the present invention is to devise a damping conduit for a low pressure branch provided with a connecting unit having low production costs and a simple and reliable assembly.

BRIEF DESCRIPTION OF THE DRAWINGS

For a better understanding of the present invention, a preferred embodiment is now described, purely as a non-limiting example, with reference to the attached drawing in which.

BEST MODE FOR CARRYING OUT THE INVENTION

Figure 1:
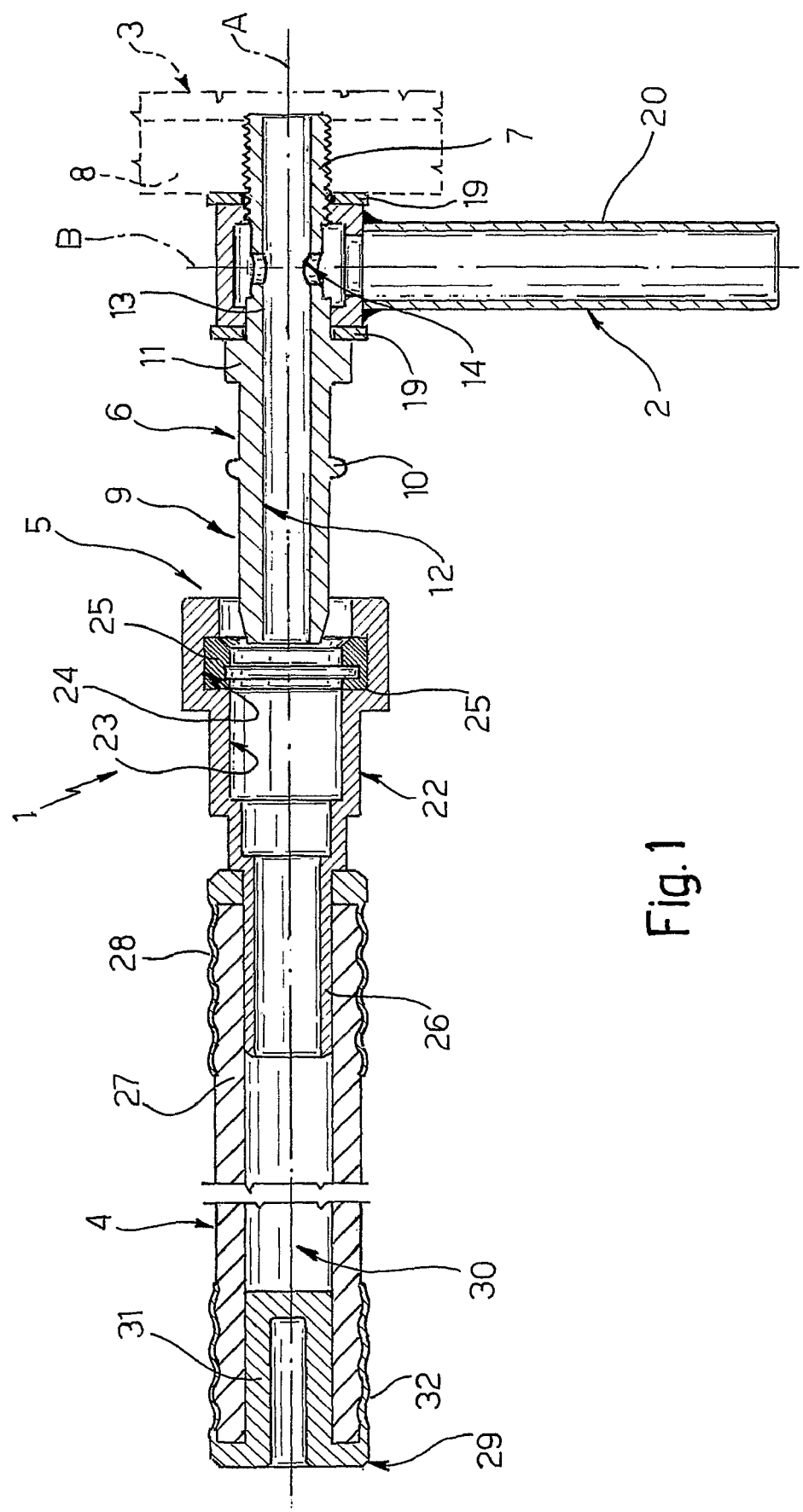
FIG. 1 represents a partial longitudinal section of a damping conduit according to the present invention.
Figure 2:
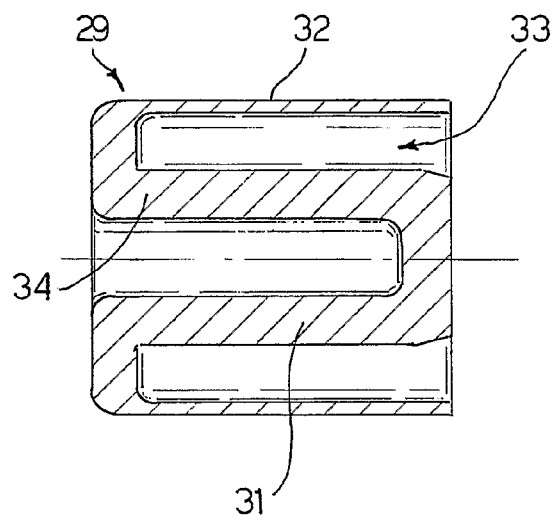
FIGS. 2 and 3 are longitudinal sections of respective enlarged details of FIG. 1.
Figure 3:
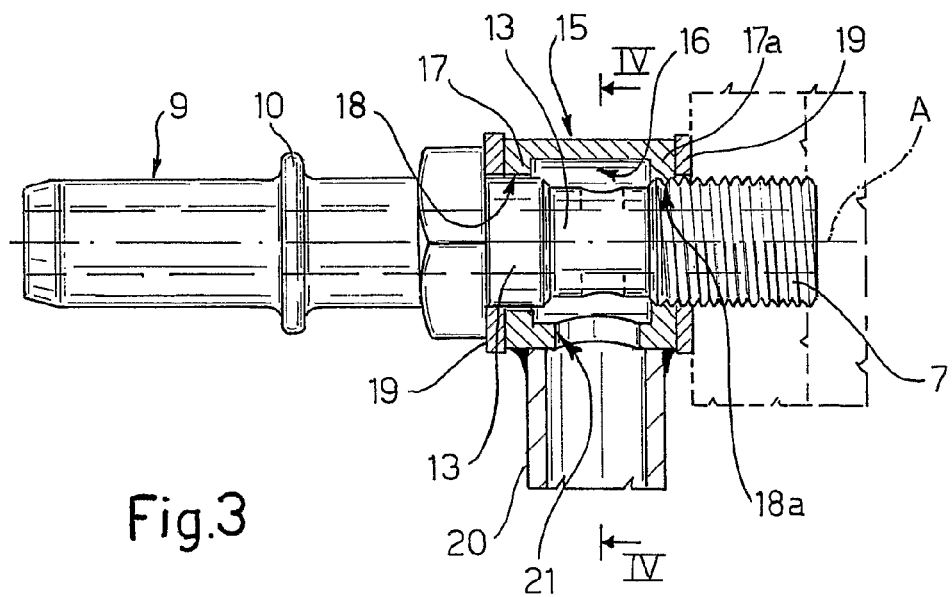
Figure 4:
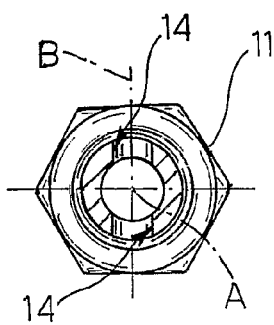
FIG. 4 is a radial section of FIG. 3 along the line IV-IV.

In FIG. 1 the number 1 indicates a portion of a low pressure branch of a power steering circuit comprising a drainage pipe 2 presenting a flexible portion not illustrated and suited to connect a steering actuator 3 to a tank, and a flexible damping conduit assembly 4 presenting a connection unit 5 for fluidly connecting the damping conduit assembly 4 itself to the steering actuator 3 and to the drainage pipe 2.

The connecting unit 5 comprises a hollow screw 6 having a longitudinal axis A and presenting a threaded portion 7 suited to be connected to a flat supporting wall 8 of the steering actuator 3. The hollow screw 6 also comprises an axial-symmetric tubular portion 9 located on the axially opposite side of the threaded portion 7 and presenting a ring-shaped bead 10 for connecting to the damping conduit 4.

Between the threaded portion 7 and the tubular portion 9, the hollow screw 6 comprises an interposed hexagonal element 11 defining a through hole 12 coaxial with the axis A for fluidly connecting the steering actuator 3 and the damping conduit assembly 4. In addition, the hollow screw 6 comprises an intermediate portion 13 located between the hexagonal element 11 and the threaded portion 7 and defining a pair of radial openings 14 having the same axis B perpendicular to the axis A.

The hollow screw 6 couples with the drainage pipe 2 which comprises for this purpose a metal bush 15 housing the intermediate portion 13 coaxially with the axis A and defining with the portion 13 a ring-shaped chamber 16 fluidly connected to the through hole 12 by means of the radial openings 14.

Moreover, the bush 15 presents a pair of flat side walls 17, 17a defining respective holes 18, 18a the second of which is threaded and is connected in use to the threaded portion 7. In order to guarantee fluid tightness when the hexagonal element 11 grips the bush 15 against the flat wall 8, respective gaskets 19 are also provided interposed between the surfaces in contact respectively defined between the side wall 17 and the hexagonal element 11 and between the side wall 17a and the flat wall 8.

The bush 15 is welded to a metal end portion 20 of the drainage pipe 2 and presents a radial hole 21 for fluidly connecting a ring-shaped chamber 16 with the drainage pipe 2.

Perpendicular to the drainage pipe 2, the tubular portion 9 of the hollow screw 6 is also coupled along the axis A in a removable fluid-tight way with a hollow element 22 of the damping conduit assembly 4. In particular, the hollow element 22 is axially elongated and defines a cavity 23 for housing the tubular portion 9 and an end seat 24 for retaining in a substantially fixed way an elastic element 25 shaped in a known way to define a snap coupling with the ring-shaped ridge 10.

On the side axially opposite the seat 24, the hollow element 22 also comprises a tubular portion 26 blocked on a multi-layer cylindrical wall 27 of the damping conduit assembly 4 by means of a bell 28 connected in a fixed way to the hollow element 22. In particular, the tubular portion 26 is housed inside the cylindrical wall 27 and the bell 28 closes the cylindrical wall 27 on the tubular portion 26 with radial interference realising a fluid-tight blockage.

On the side axially opposite the hollow element 22, the damping conduit assembly 4 comprises a metal closing element 29 which axially delimits an internal volume 30 of the damping conduit assembly 4. In particular, the closing element 29 comprises an internal bell 31 housed inside the cylindrical wall 27 to delimit the internal volume 30 axially and open on the side opposite the internal volume 30 itself. The closing element 29 also comprises an external bell 32 concentrically connected to an edge 34 of the internal bell chamber 31 for containing the housing 31 itself and defining a ring-shaped compartment 33. The cylindrical wall 27 is housed inside the ring-shaped compartment 33 and is blocked in a fixed fluid-tight way since the bell 32 is plastically deformed in a radial direction.

Moreover, the closing element 29 is monolithic and may be realised by high-speed impact extrusion starting from an aluminum blank which is inserted in a die and is cold impacted by a suitably shaped ram to obtain the finished piece in a single processing stage.

The operation of the damping conduit assembly 4 is as follows.

The discharge fluid coming from the actuator 3 fills the internal volume 30 while it goes towards the drainage pipe 2 through the radial openings 14 and the pressure waves are passively damped thanks to the deformability of the cylindrical wall 27. Moreover, by suitably selecting the length of the damping conduit assembly 4, it is possible to generate a destructive interference which damps the pressure waves entering the drainage pipe 2.

Moreover, the closing element 29 does not present any escape gap for the fluid because the internal bell 31 is integral and sealed with the bell 32.

During assembly, the hollow screw 6 is housed in the bush 15 and the threaded portion 7 is screwed onto the flat wall 8 using a tool to turn the hexagonal element 11 which axially compresses the gaskets 19 to guarantee fluid tightness.

The advantages of the present damping conduit assembly 4 are the following.

The damping conduit assembly 4 is directly connected on the hollow screw 6 allowing a connection that is easy to produce and inexpensive.

Moreover, the realisation of the tubular portion 9 requires minimum costs as it may be made on a lathe, like numerous other processes of the hollow screw 6, thereby avoiding changing machine during production.

The use of the snap connection defined by the tubular portion 9 and by the hollow element 22 allows the damping conduit assembly 4 to be assembled separately and easily with an assembly comprising the hollow screw 6 and the drainage pipe 2. Moreover, assembly and disassembly are facilitated, for example during maintenance.

Moreover, the bush 15 of the drainage pipe 2 defines a connection system used in other applications, allowing a possible reduction of costs for scale economy.

The monolithic closing element 29 allows an improved fluid tightness and it is inexpensive and fast to manufacture with impact extrusion, also increasing ease of assembly in comparison with the prior art which generally comprises two separate pieces.

Lastly it is clear that modifications and variations may be made to the damping conduit assembly described and illustrated herein without departing from the scope of the present invention, as defined in the enclosed claims.

By suitably selecting the dimensions of the connecting unit 5 it is possible to apply the silencer conduit 4 also on a high pressure branch provided with an assembly comprising a hollow screw and a bush similar to those previously described.

The hollow screw 6 may be made axial-symmetrically and then curved to satisfy layout requirements.

The closing element 29 may be manufactured using other technologies, for example forging or drawing, both hot and cold.

The hollow screw 6 may comprise a connecting portion, for example snap connection, instead of the threaded portion 7, for connecting to the steering actuator 3.

It is possible to connect the hollow screw 6 to a different hydraulic user than the steering actuator 3.

The invention claimed is:

1. A device adapted for damping fluid pulsations in a hydraulic system having an actuator and a drainage pipe, said device comprising:
   a first connecting element;
   a bush housing a first end of said first connecting element for fluidly connecting said first connecting element to the actuator along a first axis and to the drainage pipe along a second axis;
   a conduit damping assembly connected to a second end of said first connecting element, said conduit damping assembly comprising a flexible cylindrical wall and a closing element axially delimiting an internal volume of said cylindrical wall filled with fluid; and
   a hollow second connecting element having a first end carried by said cylindrical wall of said conduit damping assembly and having a second end coupled to said first connecting element.

2. A device as claimed in claim 1, wherein said first connecting element further includes tubular portion having a ring-shaped ridge cooperating by snapping with said second connecting element.

3. A device as claimed in claim 2, wherein said first connecting element defines a longitudinal through hole and at least one radial opening suited to fluidly connect said through hole to the drainage pipe, and further comprises a connecting portion coupled to said flexible cylindrical wall.

4. A device as claimed in claim 3, wherein said first connecting element comprises a gripping portion suited to cooperate with a gripping tool and located between a threaded portion of the actuator and said tubular portion.

5. A device as claimed in claim 4, wherein said at least one radial opening is located between said gripping element and the threaded portion.

6. A device as claimed in claim 1, wherein said closing element is monolithic.

7. A device as claimed in claim 6, wherein said closing element comprises an axially closed internal portion and a bell rigidly connected to said internal portion for defining a ring-shaped compartment housing an end portion of said cylindrical wall.

8. A device as claimed in claim 1, wherein said closing element is manufactured by means of a plastic deformation process.

9. A hydraulic unit adapted for use with an actuator of a hydraulic system, said hydraulic unit comprising:
   a drain pipe connected to the actuator by means of a first connecting element, said drain pipe extending along a first axis;
   a bush having a first opening coupled to an end of said drain pipe for fluidly connecting the actuator to the pipe, said bush extending along a second axis oriented transverse to said first axis, said bush further having a second opening for housing a first end of said first connecting element;
   a second connecting element having a first end coupled to said bush; and
   a damping conduit assembly connected to a second end of said second connecting element and fluidly connected to said pipe, said damping conduit assembly comprising a flexible cylindrical wall and a closing element axially delimiting an internal volume of said cylindrical wall filled with fluid.

10. A hydraulic unit as claimed in claim 9, wherein said bush houses an intermediate portion of said first connecting element and defines a ring-shaped chamber fluidly communicating with said damping conduit assembly and with said drain pipe.

11. A hydraulic unit as claimed in claim 9, wherein said actuator is a steering actuator and said drain pipe is suited to be connected to a tank.

* * * * *

UNITED STATES PATENT AND TRADEMARK OFFICE
CERTIFICATE OF CORRECTION

PATENT NO. : 7,744,132 B2  Page 1 of 1
APPLICATION NO. : 11/996429
DATED : June 29, 2010
INVENTOR(S) : Tabaro et al.

It is certified that error appears in the above-identified patent and that said Letters Patent is hereby corrected as shown below:

In claim 9, column 4, line 42, the word "haying" should be changed to -- having --.

Signed and Sealed this

Seventh Day of September, 2010

David J. Kappos
*Director of the United States Patent and Trademark Office*